United States Patent [19]

Lünig

[11] Patent Number: 4,564,327

[45] Date of Patent: Jan. 14, 1986

[54] CONTAINER FOR FEEDING ARC FURNACES

[75] Inventor: Hermann Lünig, Moers, Fed. Rep. of Germany

[73] Assignee: Mannesmann Aktiengesellschaft, Duesseldorf, Fed. Rep. of Germany

[21] Appl. No.: 488,206

[22] Filed: Apr. 25, 1983

[30] Foreign Application Priority Data

Apr. 30, 1982 [DE] Fed. Rep. of Germany ....... 3216102

[51] Int. Cl.[4] .............................................. B65G 65/32

[52] U.S. Cl. .................................... 414/199; 222/185; 294/68.22

[58] Field of Search ............... 414/160, 172, 199, 403, 414/411, 624, 625; 294/69 R, 116, 68.21, 68.22; 220/69, 85 K; 222/184, 185

[56] References Cited

U.S. PATENT DOCUMENTS

| | | | |
|---|---|---|---|
| 674,503 | 5/1901 | Haegg | 294/69 R X |
| 2,387,457 | 10/1945 | McIlwrick et al. | 294/69 R |
| 2,626,828 | 1/1953 | Morgan | 294/69 R |
| 2,678,230 | 5/1954 | Consoldane et al. | 294/69 R |
| 2,993,724 | 7/1961 | Pakulla | 294/69 R |
| 3,000,661 | 9/1961 | Catania | 294/68.22 |
| 3,161,989 | 12/1964 | Sigler et al. | 294/69 R X |
| 3,418,019 | 12/1968 | Fadler | 414/199 X |
| 3,491,923 | 1/1970 | Osipov | 294/69 R X |
| 3,664,702 | 5/1972 | Hyde | 294/69 R |

FOREIGN PATENT DOCUMENTS

| | | | |
|---|---|---|---|
| 834427 | 3/1952 | Fed. Rep. of Germany | 414/199 |
| 1120638 | 12/1961 | Fed. Rep. of Germany . | |
| 121907 | 6/1948 | Sweden | 414/199 |

*Primary Examiner*—Robert J. Spar

*Assistant Examiner*—Stuart J. Millman

*Attorney, Agent, or Firm*—Ralf H. Siegemund

[57] ABSTRACT

A feeder container for arc furnaces is disclosed having fold-down bottom segments which are prevented from swinging outward by a ring disposed underneath the container proper to prevent the segments from hitting the furnace wall. The segments are constructed as double-arms levers, with a shorter radially outwardly oriented lever arm in each instance, held down by a bottom ring of an outer jacket, the jacket being provided with windows and the up and down movement of the outer jacket in conjunction with the lever action is used to control the discharge or retention of material kept in an annular space between the container proper and the outer jacket.

3 Claims, 2 Drawing Figures

CONTAINER FOR FEEDING ARC FURNACES

BACKGROUND OF THE INVENTION

Figure 1:
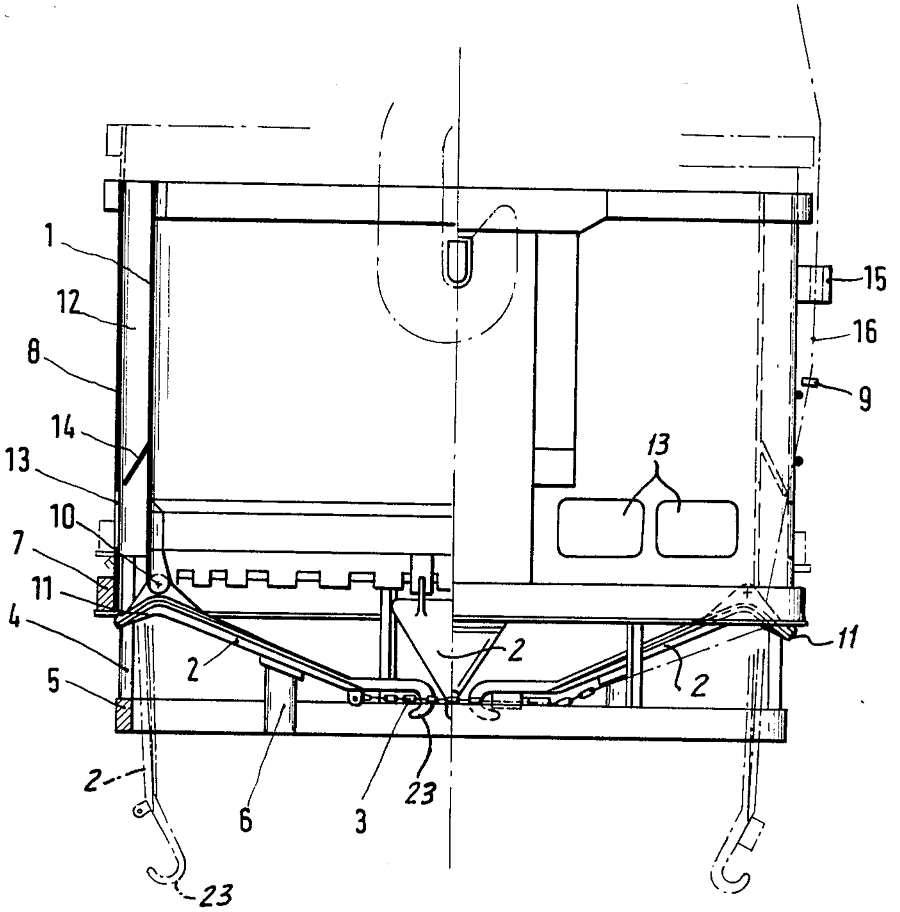

The present invention relates to a container for feeding arc furnaces, the container having a segmentized bottom for release of the content of the container by means of controlling folding down of the segments.

German printed patent application No. 1120638 discloses a container and feeding device for arc furnaces of the type to which the invention pertains. The container includes segmentized, sector-like or pie-shaped flap elements which can be folded down. The container is provided with a closure construction which is comprised of two axially slidable interconnected disc-shaped bodies having a beaded construction along the edges. The bottom segments have thicker ends which are inserted between the two disc-shaped closure bodies. As the two bodies are pushed towards each other, the segments are held in position.

Feeder containers having such a segmentized bottom permit deep insertion of the respective container into the furnace, opening the container briefly above the melting vessel and retracting the container thereafter. The feeding is therefore characterized by only minor development of kinetic energy of the content of the container as it drops through the open bottom. Accordingly, the brick lining of the furnace will experience little or not wear on account of mechanical impact by feeder materials. Also, the raw materials such as scrap metal will not be blended or mixed as a result of the feeding process.

Feeding as described, is generally of advantage, however, the particular container's construction is disadvantaged by the fact that the bottom segments open in an uncontrolled manner, i.e. after release the segments pivot down in an uncontrolled manner simply by the force of gravity and will readily overshoot. This means that this kind of container is not suitable for use in arc furnaces in which the wall construction above the melted bath includes or consists of water-cooled tubing.

DESCRIPTION OF THE INVENTION

It is an object of the present invention to provide a new and improved feeder container for arc furnaces and having an openable segmentized bottom for deep insertion into a furnace, being constructed however so that the folding down of the segments into the open position will not result in any damage of parts within the furnace.

In accordance with the preferred embodiment of the present invention, it is suggested to provide the segmentized bottom of such a container with a limiting structure which limits the movement of the segments in radial or lateral outer direction. This stop structure can simply be constructed as a ring or annulus which is situated below the hinge elements to which the bottom segments are connected. This ring or annulus has preferably an inner diameter which is essentially the same as the inner diameter of the container.

In accordance with another feature of the present invention, it is suggested to provide the bottom segments with protruding elements which are extended in outer direction and establish a second lever arm, the respective segment being the first arm of what can be termed a two arm lever. These levers support an axially movable ring tending to close the segments. This way, one makes sure that after the container content has been discharged, the bottom segment will, in fact, completely or at least to a considerable extent, pivot back into a closing position. This feature avoids and removes the particular disadvantage of prior art segmentized feeder containers, namely, the problem of closing these containers after discharge.

In accordance with a further construction and feature of the invention, it is suggested to provide the lever actuating annulus as a part of a jacket which circumscribes the container, thereby establishing an annular gap between the container proper and the jacket. This annular gap or space can be used in an advantageous fashion to feed additives of a granular consistency, for example, lime, together with a scrap feeding. In particular, the arrangement may be such that the container is provided with an outwardly inclined (frusto conical) partition closing the annular gap or space in its respective lower part. The outer jacket is provided with outwardly directed openings which are located above the partition when the jacket is lifted while these openings are situated below the lower edge of the partition as the jacket is lowered. The additive is discharged through these openings upon lifting of the jacket, and is annularly deposited near the wall. If, as is usually the case, lime is deposited in such a manner, the lime will dry in the heat during the melting and can be deposited in a delayed fashion after drying. Thus, contrary to the previous requirements, it is no longer necessary to provide for a separate drying of the lime. Also, the lime as such affords protection to the inner wall of the furnace and does not interfere with the function of the electrodes.

Figure 2:
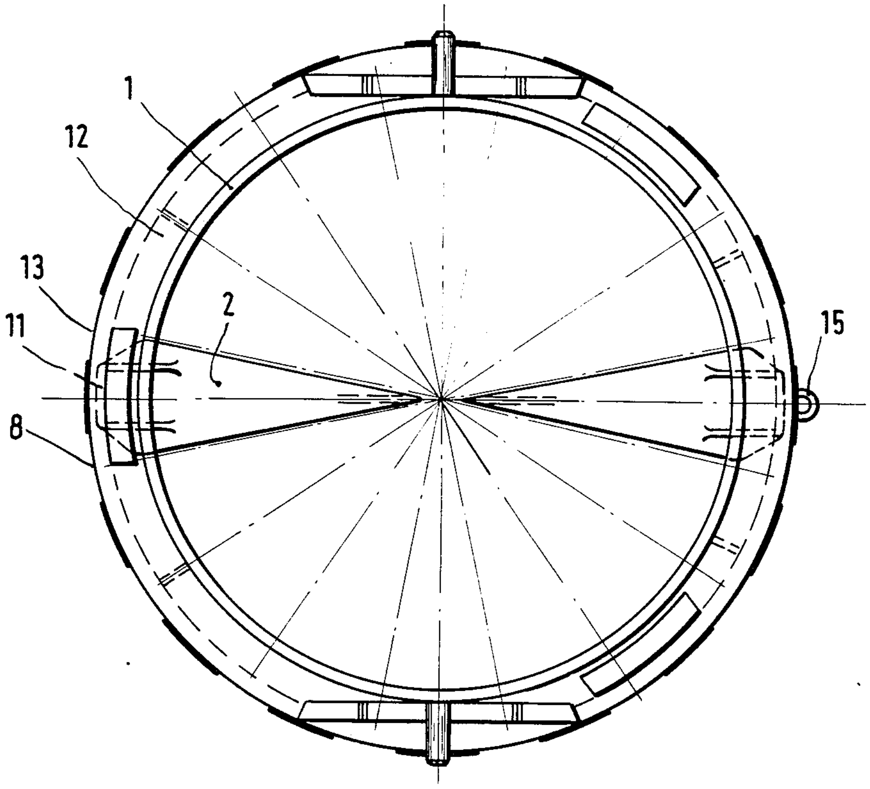

While the specification concludes with claims particularly pointing out and distinctly claiming the subject matter which is regarded as the invention, it is believed that the invention, the objects and features of the invention, and further objects, features and advantages thereof will be better understood from the following descriptions taken in connection with the accompanying drawings in which:

FIG. 1 is a longitudinal section view through a feed container constructed in accordance with the preferred embodiment of the present invention for practicing the best mode thereof; and FIG. 2 is a top view of the container of FIG. 1.

Proceeding now to the detailed description of the drawings, a feed container for arc furnaces shown in the drawings is comprised of an inner cylindrical jacket 1 or container proper, made of sheet metal. The bottom of the container is constructed from a multiple of pie-shaped segments 2 which can be folded down and are hinged near the lower periphery of the cylinder 1. The bottom segments 2 are normally held in a closing position by means of a closing chain 3. This chain 3 is looped around hook shaped extensions 23 of the bottom segments 2, and tightened by a closing pin (not shown). The bottom of the container is opened, i.e. the segments 2 are permitted to fold down by means of a tension member 16 (chain or cable) which, upon being pulled, removes the safety pin of the chain 31 normally looping around various hook elements 23, but as the safety pin is pulled, the chain drops and the hooks 23 are released.

The container 1 is provided with bars 4 which in fact extend in down direction from the lower end of the container. These bars 4 support an annulus 5, and serve as an annular stop for all of the segments 2. Thus, as the chain 3 releases the segments 2, they will fold down and that down motion will develop a certain speed tending to move the tips of the segments with the hooks 23 in radial outer direction. However, the annulus 5 stops them and holds them in a vertical down position. In addition, one can see that when the segments 2 are folded up and close the container bottom, annulus 5 establishes the lowest construction element of the assembly and can be used as stand for the container.

Reference numeral 10 refers to hinge elements by means of which the segments 2 are pivotably mounted to the lower portion of cylindrical jacket 1. The segments as a whole and as so hinged, can be construed as double-arm levers because they are, so to speak, rearwardly provided with radially outwardly extending projections 11 which are situated in the gaps between the azimuthally spaced bars 4. Projections 11 constitute the short arm of a two arm lever in each instance, the respective pie-shaped segment 2 is the long arm. An axially slidable ring 7 sits on these projections 11. The weight of that ring 11 acts on these projections 11, and due to the lever-like configuration, the ring tends to place the segments 2 into bottom-closing positions. In particular, the segment 2 shown in the lower left-hand portion of FIG. 1 experiences a counterclockwise acting momentum or torque tending to place the segment into a bottom closing position.

As long as the container is filled with heavy scrap, there is no question that the segments 2 will fold down under the weight of that content as soon as the chain 3 is released. The weight of the ring 7 and the resulting forces, and of course considerably smaller than the opening force as provided under the load of the content of the container. This in turn means that the annulus 7 is shifted up by operation of the lever arms 11. The scrap falling through the open bottom will act laterally upon the bottom segments, holding the bottom open during the discharge.

As soon as the contents of the container is discharged, no opening force acts any longer upon the segments 2, and now the weight of the ring 7 prevails and acts upon the lever arm 11 so that the segments are folded shut. There may be some residue deposits so that the bottom may not be completely closed at that point. However, the main aspect is that the segments 2, with hook element 23, will positively be pivoted up sufficient to clear the plane defined by the lower axial end of the annulus 5. In other words, they will no longer stick out from under the rim 5.

Reference numeral 6 refers to an annulus which is not part of the container but which is situated in a support plane outside of the furnace and the container 1 is placed in a concentric relation to that ring 6 which pushes the segments into the final closing position as the ring 5 sits on the same support plane. Now the chain 3 can be refastened and the container is again ready for receiving a fresh charge.

In the embodiment illustrated in FIG. 1, the ring 7 is actually a lower portion of an outer jacket 8 which circumscribes the inner jacket 1. Accordingly, an annular gap 12 is established between inner jacket 1 and outer jacket 8. This annular gap or space establishes an annular cavity which can be filled with any material. For example, it may be filled, in part at least, with an additive such as lime. The outer jacket 8 is, of course, movable in an axial direction and in effect it adds to the weight provided by the annulus 7 that acts upon the lever arms 11 as they send to close the bottom of the container.

The outer jacket 8 is provided with a plurality of openings or windows 13, situated in the lower portion of the jacket 8 just above the ring 7. A frusto-conical partition 14 is provided within the gap 12; the partitionment extends oblique from and is radially outwardly oriented in relation to the wall or jacket 1. The lower edge of that partition 14 ends just above the upper edge of the windows or openings 13. However, this condition exits only as long as the segments 2 are closed, the ring 7 having accordingly its lowermost position.

It will be recalled from the description above that upon opening of the bottom through fold down of the segments 2, the ring 7 is pushed axially in up direction by operation of the lever arms 11. Accordingly, the outer jacket 8 is likewise lifted and the windows, at least an upper portion of each of the windows 13, will now be situated above the lower edge of the partition 14. Thus, any material that is located in the annular space 12 above the partition 14 will be permitted to be radially outwardly discharged through the windows 13. This, in fact, occurs in exactly the same instant the bottom of the container opens to discharge the content of the container proper. That content discharges centrally, basically along the axis of the container 1, while the content of the chamber 12 forms a annular discharge sheath so that, in fact, the content of the space 12 is discharged only relatively close to the inner wall of the furnace, in radially outwardly displaced relationship to the discharge of the content of the container proper.

As shown in the right hand portion of FIG. 1, the tension member 16, by means of which the safety pin is removed from the chain 3, is provided with a lock or stop member 9 which limits the upward pull of the release chain or cable 16. This limits pulling of the member 16 and is provided directly by a stop 15 having an inner opening or channel through which the cable or chain 16 may pass but through which the stop member 9 will not pass, thereby limiting the displacement and up movement of the member 16.

In addition one can see that the tension member 16 will also hold the upper jacket 8 in an upper position, simply through coaction of the members 9 and 15 when abutting. Thus, holding the cable or chain 16 tightly operates, in fact, as a suspension of the outer jacket 8 in the lifted disposition. This means that the down motion of the outer jacket 8 and of the ring 7 for closing the bottom segment 2 can be delayed, for example, until all of the contents of the gap 12 is discharged. It will be recalled that the normal closing operation of the bottom segments 2 is initiated as soon as the content proper of the container 1 has discharged. This may occur prior to the complete discharge of the content of spaces 12. Thus, by holding the jacket 8 in the lifted position, the lowering of the jacket 8 and reclosing of the gap 12, can be delayed in a controlled manner.

The inventive construction is subject to modifications which do not constitute departures of the scope as claimed. For example, between the inner and the outer jackets of the container, one may provide a differently constructed latching structure which holds the bottom segments in a closed position without requiring the looping of the chain 3 through hook elements at inner ends of each of the segments. In particular, the ring 7 may be locked in a position when having the lowermost disposition and that lock prevents the ring 7 from being pushed up. This in turn means that the lock ring 7 acts upon the lever arms 11 such that the bottom segments are forced to remain in a bottom closing disposition as long as the ring 7 is so locked. The lock may be subject to operation including release by mechanical or hydraulic means acted upon from the outside, particularly from the crane and other hoisting equipment by means of which the container is manipulated, and the release occurs exactly at that instant when the container is disposed above the furnace's hearth.

I claim:

1. A container for feeding an arc furnace having a container element proper and foldable or hinged, bottom segments amenable to assume a closing position but upon release folding down for opening the bottom, the improvement comprising a container, each of said segments being constructed as a double-arm lever, a second arm in each instance, respectively, extending radially outwardly from a point of hinging;

annular means extending underneath said container element and limiting radial outer displacement of the segments when folded down, and a separate annular ring which acts upon said radially outwardly extending lever arms, tending to fold the segments up toward closing the bottom of the container.

2. Container as in claim 1, and including a second outer jacket concentrically arranged to said container element, there being a gap in between, said ring being disposed in the lower portion of said outer jacket.

3. Container as in claim 2, there being a frusto-conical partition provided between said container element and said outer jacket, said outer jacket being provided with apertures situated below said partition when said segments close the bottom, but at least a portion of each of said apertures being disposed above the partition when the segments are folded down for opening the bottom.

* * * * *